United States Patent [19]

Hirsbrunner et al.

[11] Patent Number: 4,530,799

[45] Date of Patent: Jul. 23, 1985

[54] BETAINE DERIVATIVE

[75] Inventors: Pierre Hirsbrunner, Corseaux; Raymond Bertholet, Aigle, both of Switzerland

[73] Assignee: Nestec S. A., Vevey, Switzerland

[21] Appl. No.: 158,825

[22] Filed: Jun. 12, 1980

Related U.S. Application Data

[60] Continuation of Ser. No. 920,969, Jun. 30, 1978, abandoned, which is a continuation-in-part of Ser. No. 811,203, Jun. 29, 1977, abandoned, and Ser. No. 811,191, Jun. 29, 1977, abandoned, said Ser. No. 811,203, is a continuation of Ser. No. 635,122, Nov. 25, 1975, abandoned, which is a continuation of Ser. No. 547,602, Feb. 6, 1975, abandoned, said Ser. No. 811,191, is a continuation of Ser. No. 635,122, , , which is a division of Ser. No. 547,602.

[30] Foreign Application Priority Data

Mar. 12, 1974 [CH] Switzerland .......................... 3412/74

[51] Int. Cl.³ ........................................... C07C 101/04
[52] U.S. Cl. .................. 260/501.13; 426/534
[58] Field of Search ...................................... 260/501.13

[56] References Cited

FOREIGN PATENT DOCUMENTS 2300492  7/1973  Fed. Rep. of Germany ...................... 260/501.13
2506151  9/1975  Fed. Rep. of Germany ...................... 260/501.13

OTHER PUBLICATIONS

Anslow et al., Biochemical Journal, vol. 28, pp. 1253-1263, 1928.

Primary Examiner—James H. Reamer
Attorney, Agent, or Firm—Vogt and O'Donnell

[57] ABSTRACT

A new betaine salt corresponding to the formula $(CH_3)_3N^+—CH_2—COO^-.Na^+.Cl^-.2H_2O$ is disclosed. It is obtained in pure crystalline form by preparing a starting aqueous solution containing the ions $(CH_3)_3N^+—CH_2—COO^-$, $Na^+$ and $Cl^-$ whose composition, as illustrated in a ternary diagram of betaine-NaCl-water shown in the drawing, is situated in an area between two lines diverging from a common point T and passing through the points I and II, adding to the starting solution betaine, sodium chloride and water in molar proportions of 1:1:2 or betaine hydrochloride, sodium hydroxide and water in molar proportions of 1:1:1, and thereafter separating the double betaine salt by crystallization at a temperature below 50° C. The double betaine salt is useful as a seasoning.

6 Claims, 1 Drawing Figure

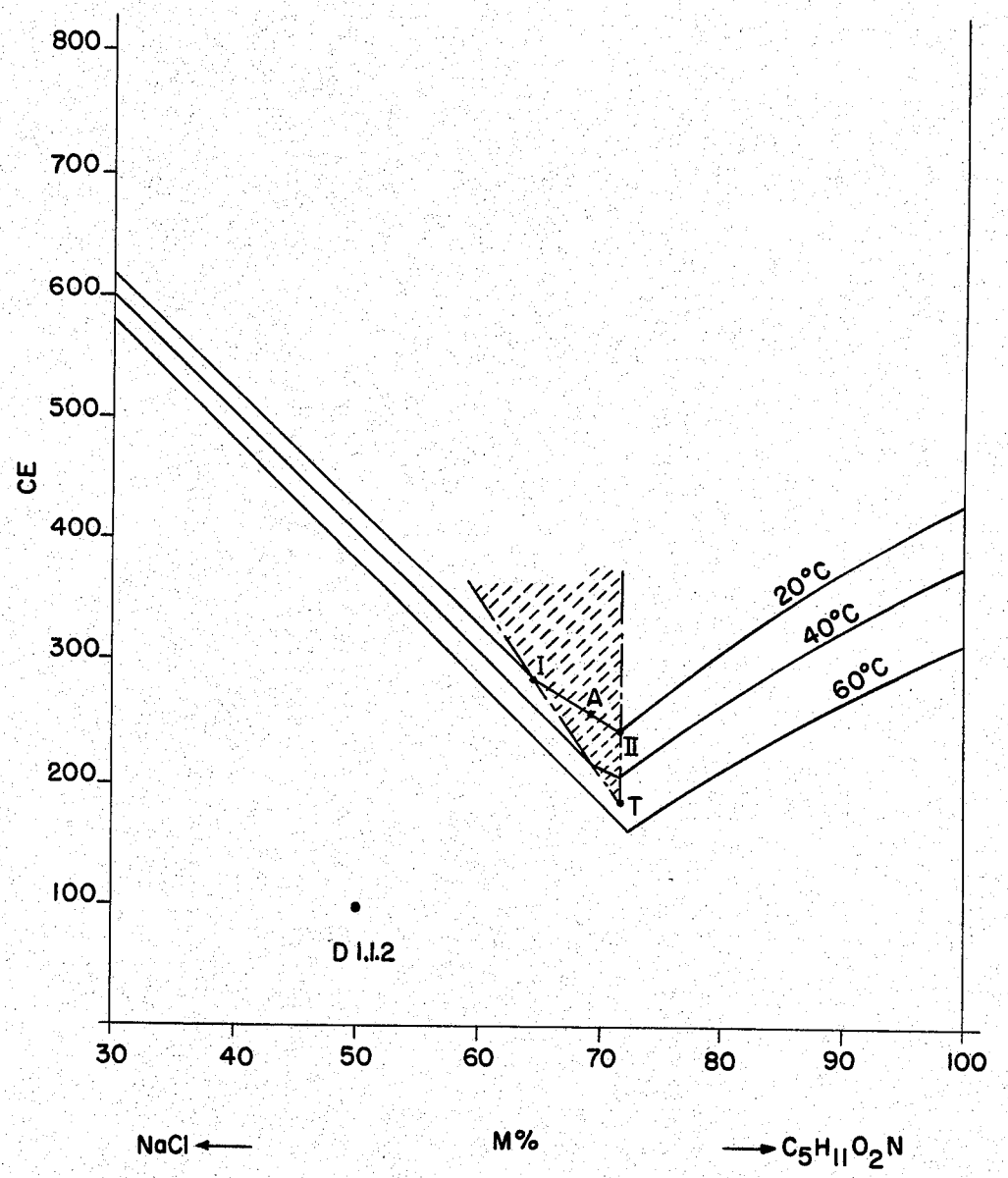

BETAINE DERIVATIVE

CROSS REFERENCE TO RELATED APPLICATIONS

This Application is a continuation of application Ser. No. 920,969, filed June 30, 1978 now abandoned, which is a continuation-in-part of applications Ser. Nos. 811,203 and 811,191 both filed June 29, 1977. Ser. No. 811,203 is a continuation of Ser. No. 635,122 filed Nov. 25, 1975 which is in its turn a continuation of Ser. No. 547,602 filed Feb. 6, 1975. Ser. No. 811,191 is a continuation of Ser. No. 635,123 filed Nov. 25, 1975 which is in turn a divisional of Ser. No. 547,602 all now abandoned.

BACKGROUND OF THE INVENTION

This invention relates to the production of a double betaine salt corresponding to the formula $$(CH_3)_3N^+—CH_2—COO^-.Na^+.Cl^-.2H_2O \quad (I)$$

which is useful as a seasoning agent.

Betaine is an internal salt corresponding to the formula $$(CH_3)_3N^+—CH_2—COO^-$$

in the form of colourless, deliquescent crystals. It crystallises from alcohol with 1 molecule of water which it loses at 100° C. It is highly soluble in water, readily soluble in acetone and substantially insoluble in ether.

Betaine occurs widely in nature, especially in sugar beet. It can be synthesized, in particular from trimethylamine and chloroacetic acid, or by methylating aminoacetic acid (glycine). On an industrial scale, it is obtained for example from sugar beet molasses by way of its hydrochloride corresponding to the formula $$(CH_3)_3N^+—CH_2—COO^-.H^+.Cl^-$$

which readily dissolves in water, liberating free hydrochloric acid.

In the food industry, betaine hydrochloride is added to yeast powders as an acid component, and is also used in effervescent products as a substitute for organic acids such as tartaric acid, citric acid, etc.

Several attempts have been made to substitute salts of aminoacids for sodium chloride as seasoning agents. For example, U.S. Pat. No. 1,874,055 discloses the use of glutamates and U.S. Pat. No. 2,601,112 of mixtures of ammonium, potassium and choline salts having saline properties. Various betaine salts are disclosed, among which betaine sodium chloride sesquihydrate in *Biochemistry J.* 22, 1263 (1928) (no use of this salt being given) and betaine hydrochloride, aspartate and salicylate in *Merck Index*, 8th edition, 145 (1968) with the indication of their acidic or sweet and astringent taste. In published German patent application No. 2,300,492 a method of preparing betaine is disclosed, which comprises reacting betaine hydrochloride with sodium hydroxide and extracting betaine from the aqueous solution with an organic solvent.

The prior art, however, fails to indicate or even suggest that a new crystalline double betaine salt can be prepared in a very simple way which has interesting flavouring properties and is therefore suitable as a seasoning agent.

DESCRIPTION OF THE INVENTION

The present invention relates to a new pure product consisting of a crystalline double betaine salt corresponding to the formula $$(CH_3)_3N^+—CH_2—COO^-.Na^+.Cl^-.2H_2O \quad (I)$$

of which the empirical formula is $$C_5H_{15}O_4NNaCl$$

and having the following characteristics:

| Composition: | NaCl | 27.6% |
| --- | --- | --- |
|  | betaine | 55.4% |
|  | water | 17.0% |
| Apparent density: | 0.39 (before compaction) | |
|  | 0.47 (after compaction) | |
| Appearance: | fine, white needles, highly soluble in water, melting at 75° C. Its aqueous solution is chemically inert. The crystals are anisotropic. | |

The invention also relates to a process for producing the double betaine salt defined above. The process according to the invention comprises the steps of preparing an aqueous starting solution containing the ions $(CH_3)_3N^+—CH_2—COO^-$, $Na^+$ and $Cl^-$ whose composition as illustrated in a ternary diagram of betaine-NaCl-water is situated in an area between two lines diverging from a common point T and passing through the points I and II defined by the following molar ratios:

| | Moles of betaine | Moles of NaCl | Moles of H₂O |
| --- | --- | --- | --- |
| T | 72 | 28 | 185 |
| I | 64 | 36 | 285 |
| II | 72 | 28 | 245 | and adding to this starting solution solutes giving the ions $(CH_3)_3N^+—CH_2—COO^-$, $Na^+$ and $Cl^-$ and water in molar proportions corresponding to the formula I, thereby inducing the crystallisation of the desired double betaine salt.

The graph shown in the drawing illustrates a ternary system of betaine-NaCl-water as a function of isotherms at 20° C., 40° C. and 60° C. The mole percent of betaine, i.e., the ratio (in %) of the number of moles of betaine to the total number of moles of betaine and NaCl is recorded on the abcissa as M%, whilst the mole percent of water, i.e., the ratio (in %) of the number of moles of water to the total number of moles of betaine and NaCl is recorded on the ordinate as CE. In the diagram, T represents the composition of a solution saturated with NaCl, betaine and double betaine salt, on the 50° C. isotherm, I,II are the extreme points, on the 20° C. isotherm, of the existence zone of the starting solution for the formation of the double betaine salt, D 1.1.2 represents the composition of the crystalline double betaine salt, A represents the composition of a preferred starting solution on the 20° C. isotherm, CE is the ratio (in %) of n moles of water to total moles of betaine and NaCl.

It should be clear that the diagram only serves as an illustration of the crystallisation process. The hatched area in this diagram represents the area in which the point corresponding to the molar composition of the starting solution should be for crystallisation of the desired double betaine salt.

Thus for example, the point T corresponds to a solution containing 72 moles of betaine, 28 moles of sodium chloride and 185 moles of water. In fact only the ions $(CH_3)_3-N^+-CH_2-COO^-$, $Na^+$ and $Cl^-$ are present in the starting solution within the hatched area, however, for convenience of calculation and illustration the diagram is set forth as moles of betaine and NaCl.

When a starting solution having a molar composition corresponding to the point I, i.e., corresponding to 64 moles of betaine, 36 moles of NaCl and 285 moles of water, and solutes are then added which provide the betaine, sodium and chloride ions in addition to water corresponding to the molar ratio found in the double betaine salt, NaCl begins to crystallize and the point is displaced to the right on the line I–II because the solution becomes enriched in betaine ions. When the addition of these solutes continues in the same molar proportions, then the crystallisation of double betaine salt is promoted and the point remains stationary.

Conversely, when a starting solution having the molar composition corresponding to the point II, i.e., corresponding to 72 moles of betaine, 28 moles of NaCl and 245 moles of water and solutes are then added which provide the betaine, sodium and chloride ions in addition to water corresponding to the molar ratio of the double betaine salt, betaine begins to crystalize and the point is displaced to the left on the line I–II as the solution becomes enriched in sodium and chloride ions and on further addition of these solutes, the point remains stationary.

It should be noted that no crystallisation of the double betaine salt can be obtained starting from a solution whose composition is not within the hatched area. The point T is the lower limit of the hatched area and is located on the 50° C. isotherm. Therefore, no crystallisation is possible in the area of the diagram which is under the 50° C. isotherm, i.e., at temperatures above 50° C. Also, no crystallisation is possible from an equimolar solution of betaine and sodium chloride which has been prepared by dissolution in water. By concentration, for example by evaporation, of the solution in the polytherm +20° C. to +60° C. of the ternary system of betaine-NaCl-H₂O, only isotropic-cubic crystals of NaCl are obtained. Upon cooling to −40° C., the viscosity of the mixture increases, with a solidification occurring at −50° C. However, even when crystallization seeds are added, at −20° C. no double betaine salt can be detected as a stable solid phase.

If the water is progressively removed in vacuum from an equimolar solution of betaine and NaCl, allowing equilibrium at 20° C. to be reached each time, a first crystallisation of isotropic-cubic crystals of NaCl appears. Subsequent removal of water gives rise to a simultaneous production of crops of NaCl crystals and of isotropic crystals of the double betaine salt, but no pure crystals of double betaine salt can be obtained.

As previously stated, the process of the invention is carried out in two steps.

In the first step, the starting solution is prepared, preferably from betaine hydrochloride and sodium hydroxide. By dissolving betaine hydrochloride and sodium hydroxide in water the following reaction occurs:

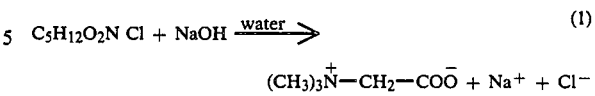

Preferably, the starting solution has a molar composition near to point A of the diagram, i.e., corresponding to 69 moles of betaine, 31 moles of NaCl and 253 moles of water.

This solution is prepared by mixing betaine hydrochloride, NaOH and water at a temperature of approximately 60° C. After cooling to approximately 40° C., a fraction of the NaCl separates from the mixture by crystallisation. Water is then added to the mixture, which is at pH 6 to 7, in a suitable amount to form the aforementioned starting solution after cooling to approximately 20° C.

Alternatively, the starting solution may be prepared from betaine and sodium chloride by dissolving these reactants in water according to the following reaction scheme:

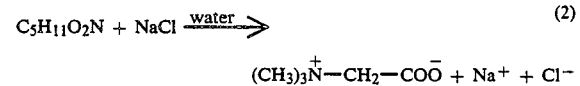

The second step of the process comprises promoting the crystallisation of the required double betaine salt by adding the solutes which provide the betaine, sodium and chloride ions in addition to water in a predetermined molar ratio corresponding to the molar ratio in the double betaine salt. In a preferred embodiment, a mixture of betaine hydrochloride, sodium hydroxide and water in the molar ratio of 1:1:1 is added to the starting solution at a temperature of about 80° C.

As soon as these reactants are in solution, the amount of hydrochloric acid which was present in the betaine hydrochloride is liberated and exactly neutralised by the NaOH added according to the following scheme:

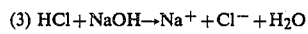

and so produces one additional molecule of water per molecule of betaine hydrochloride added. This is therefore equivalent to the addition of 1 mole betaine, 1 mole NaCl and 2 moles of water and hence alternatively, betaine, sodium chloride and water in a molar ratio of 1:1:2 may also be added to the starting solution and give rise to the crystallisation of the desired double betaine salt.

The addition of betaine and sodium chloride or alternatively, of betaine hydrochloride and sodium hydroxide to water produces the ions $(CH_3)_3N^+-CH_2-COO^-$, $Na^+$ and $Cl^-$ in electrically neutral mixture immediately on dissolution in the water. Therefore, when the aqueous solution is considered, it is no longer possible to determine the origin of the ions present, since the starting compounds no longer exist as crystalline entities. Both methods of introduction of the desired ions into the solution are therefore equivalent.

Upon addition of the required solutes in the required amounts, the solution, which has a pH value of 6–7, is cooled to approximately 20° C. and the double betaine salt crystallizes and is separated by filtration or centrifuging.

The filtrate (starting solution) is then re-used for another crystallisation.

The new product is in the form of fine, white needles readily soluble in water.

It should be emphasized that the compound obtained is a new pure crystalline compound and not a composition or mixture. This has been proved since only a pure chemical compound can have a sharp melting point. The compound is in crystalline state in the form of a lattice composed of $(CH_3)_3N^+-CH_2-COO^-$, $Na^+$ and $Cl^-$ ions at its apexes bound together by ionic bonds, whereas within the lattice $H_2O$ are entrapped molecules in the exact proportions giving the empirical formula $C_5H_{11}O_2NNaCl, 2H_2O$. It is a dihydrate, i.e., a crystalline entity clearly different from the previously known sesquihydrate. Both salts have different properties and different crystalline structures although both salts differ from each other only in the number of molecules of water entrapped in the ionic lattice. As a consequence their physical properties, i.e., melting point, solubility, etc. are not the same.

The double betaine salt has a very pleasant, rounded and mellow salt-like flavour. It is accordingly suitable for use as a seasoning and, in particular, as a flavour support, in food products.

In this connection, tests have shown that the double betaine salt may be used as a support for a much wider range of flavours, especially spices, than NaCl. For flavouring grilled meats for example, a mixture of NaCl and pepper flavouring provides the meat with a strong taste of salt which obscures the flavour of the meat. By replacing the NaCl with the double betaine salt, the pepper flavour becomes dominant without obscuring the natural flavour of the meat.

The following Examples illustrate the invention:

EXAMPLE 1

(1) Preparation of the starting solution 154 g of betaine hydrochloride (1 mole), 40 g of NaOH (1 mole) and 36 g of water (2 moles) are mixed at a temperature of approximately 60° C. to form a solution, after reaction of the betaine hydrochloride with the NaOH, containing 117 g of betaine (1 mole), 59 g of NaCl (1 mole) and 54 g of water (3 moles). These values correspond to a mole percent of betaine (N% on diagram) of 50% and a mole percent of water (CE on diagram) of 150%.

The solution is cooled to 40° C. and 32 g of NaCl (0.54 mole) separate by crystallisation. The solution then contains 59−32=27 g of NaCl (0.46 mole). Accordingly, the solution now corresponds in the diagram to a mole percent of betaine (M% in diagram) of 68.5% and a mole percent of water (CE on diagram) of 205.5%.

12 g of water (0.67 moles) are then added to this solution, which has a pH value just below 7.0. The starting solution (A) is obtained after the mixture has been cooled to 20° C., whose composition now corresponds to 1 mole of betaine, 0.46 mole of NaCl and 3.67 moles of water. In the diagram, these molar values correspond to an M% value of 68.5% and a CE value of 251.4%.

(2) Preparation of the double betaine salt 210 g of the starting solution and 42.3 g of a solution containing 30.7 g of betaine hydrochloride (0.2 mole), 8 g of NaOH (0.2 mole) and 3.6 g of water (0.2 mole) are mixed at a temperature of approximately 80° C. The mixture, which has a pH value in the range from 6.5 to 7, is cooled to 20° C., giving 42.3 g of crystals of double betaine salt. The solid phase formed by this salt is separated by centrifuging and the filtrate (starting solution) is re-used for preparing another batch of the product.

The double betaine salt obtained, which corresponds to the formula $$(CH_3)_3N^+-CH_2-COO^-.Na^+.Cl^-.2H_2O \qquad (I)$$

consists of 27.6% by weight of NaCl, 55.4% of betaine and 17% of water.

The new product is in the form of fine, white needles readily soluble in water and melting at 75° C. The new product is chemically neutral in an aqueous solution.

The double betaine salt was the subject of comparative tests as a flavour support in foods. The flavouring of a grilled meat with a mixture containing NaCl and 3% of pepper revealed a strong taste of salt obscuring the flavour of the meat, and the presence of a large number of solid grains (NaCl) at the surface of the meat. On the other hand, flavouring with a mixture of double betaine salt and 3% of pepper provides the grilled meat with a peppery note without obscuring the natural flavour of the meat.

EXAMPLE 2

The starting solution (solution A) was prepared as described in part 1 of Example I.

A mixture of 210 g of the solution A with 23.4 g anhydrous betaine (0.2 mole), 11.8 g NaCl (0.2 mole) and 7.2 g water (0.4 mole) was prepared. The pH was 6.5-7 and the solution cooled to +20° C. Crystallization occurred and 42.3 parts of betaine. $NaCl.2H_2O$ (anisotropic crystals) were removed by centrifugation. The liquid phase was then ready for the preparation of a new batch of double betaine salt.

The double betaine salt obtained, which corresponds to the formula $$(CH_3)_3N^+-CH_2-COO^-.Na^+.Cl^-.2H_2O$$

consisted of 27.6% by weight of NaCl, 55.4% of betaine and 17% of water and was in the form of fine, white needles readily soluble in water and melting at 75° C.

We claim:

1. A crystalline double betaine salt corresponding to the formula $$(CH_3)_3N^+-CH_2-COO^-.Na^+.Cl^-.2H_2O$$

2. A flavour support which comprises the double betaine salt of the formula $$(CH_3)_3N^+-CH_2-COO^-.Na^+.Cl^-.2H_2O.$$

3. The crystalline double betaine salt corresponding to the formula $(CH_3)_3N^+-CH_2-COO^-.Na^+.Cl^-.2H_2O$ prepared by the process of claim 1.

4. The crystalline double betaine salt corresponding to the formula $(CH_3)_3N^+-CH_2-COO^-.Na^+.Cl^-.2H_2O$ prepared by the process of claim 1.

5. A crystalline double betaine salt corresponding to the formula $(CH_3)_3N^+-CH_2-COO^-.Na^+.Cl^-.2H_2O$ prepared by forming an aqueous starting solution containing the ions $(CH_3)_3N^+-CH_2-COO^-$, $Na^+$ and $Cl^-$ whose composition, as illustrated in a ternary diagram of betaine-NaCl-water is situated in an area between two lines diverging from a common point T and passing through the points I and II defined by the following molar ratios:

|     | Moles of betaine | Moles of NaCl | Moles of water |
| --- | --- | --- | --- |
| T   | 72 | 28 | 185 |
| I   | 64 | 36 | 285 |
| II  | 72 | 28 | 245 | adding betaine, sodium chloride and water in molar proportions of 1:1:2 to the starting solution, and thereafter separating the double betaine salt by crystallization at a temperature below 50° C.

6. A crystalline double betaine salt corresponding to the formula $(CH_3)_3N^+—CH_2—COO^-.Na^+.Cl^-.2H_2O$ prepared by forming an aqueous starting solution containing the ions $(CH_3)_3N^+—CH_2—COO^-$, $Na^+$ and $Cl^-$ whose composition, as illustrated in a ternary diagram of betaine-NaCl-water is situated in an area between two lines diverging from a common point T and passing through the points I and II defined by the following molar ratios:

|     | Moles of betaine | Moles of NaCl | Moles of water |
| --- | --- | --- | --- |
| T   | 72 | 28 | 185 |
| I   | 64 | 36 | 285 |
| II  | 72 | 28 | 245 | adding a solution of betaine hydrochloride, sodium hydroxide and water in molar proportions of 1:1:1 to the starting solution and thereafter separating the double betaine salt by crystallization at a temperature below 50° C.

* * * * *